Feb. 23, 1926.  
J. J. ROBINSON  
SAW GAUGE  
Filed Nov. 15, 1923 2 Sheets-Sheet 1  
1,574,445
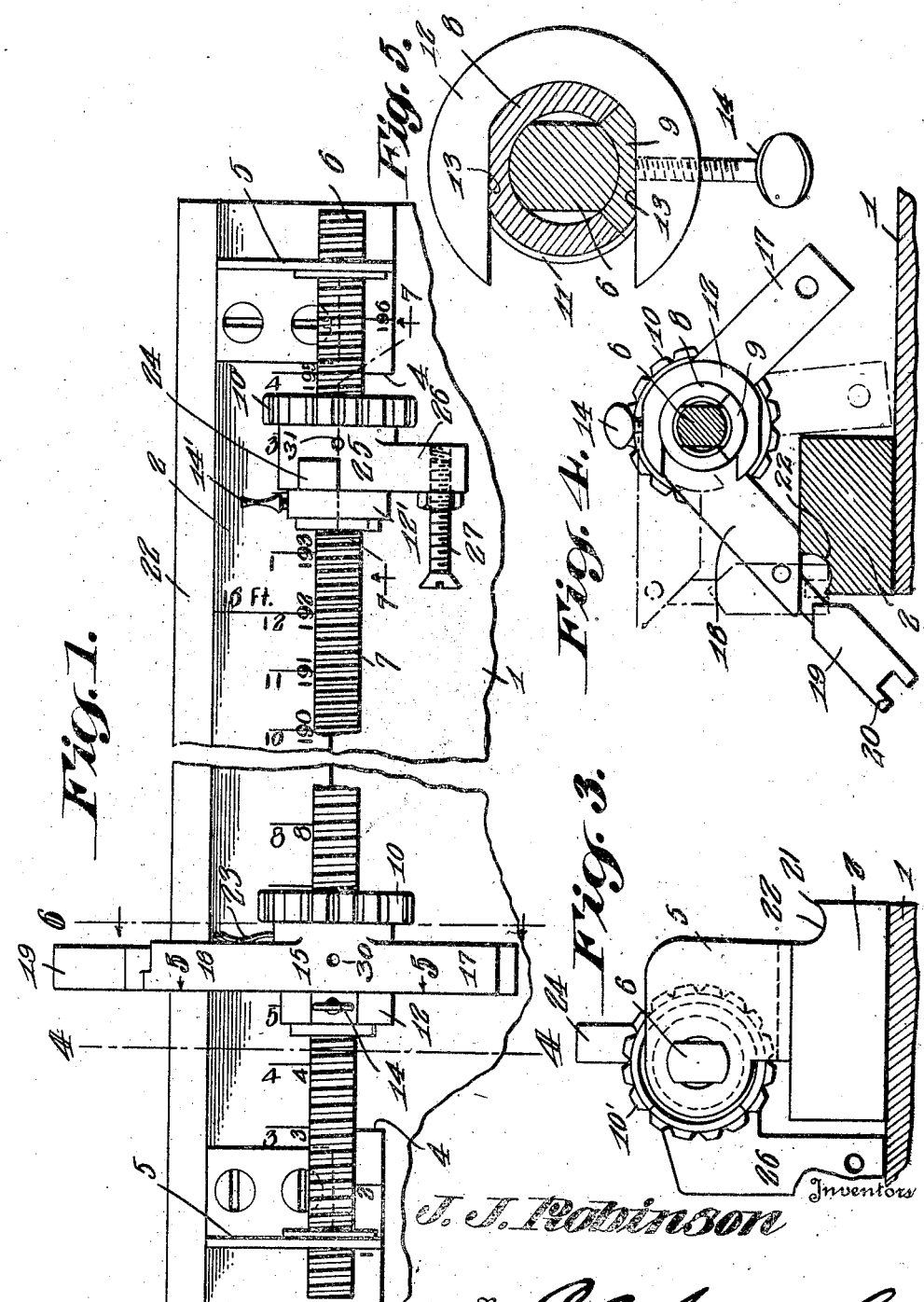
Inventor  
J. J. Robinson  
By C. A. Snow & Co.  
Attorney

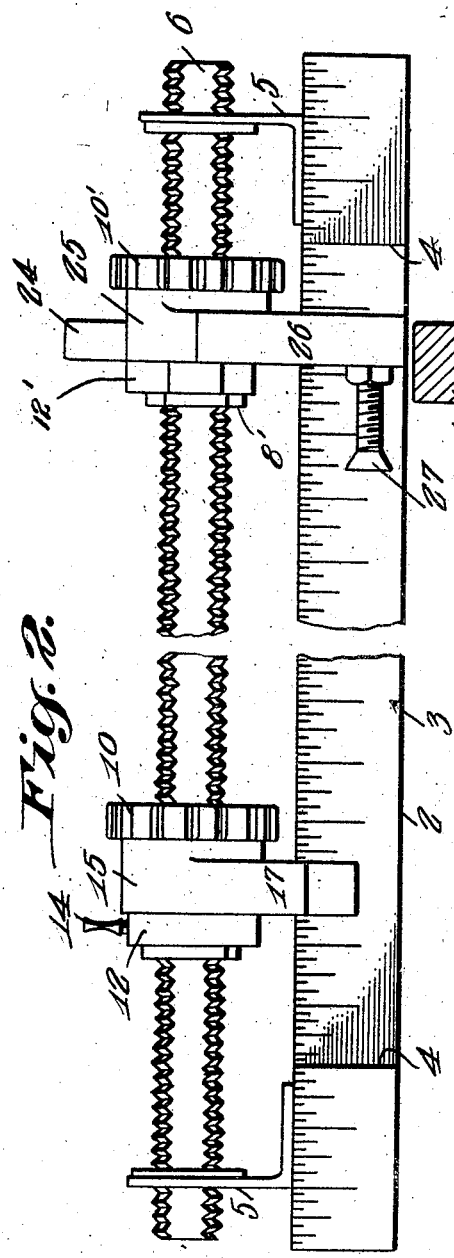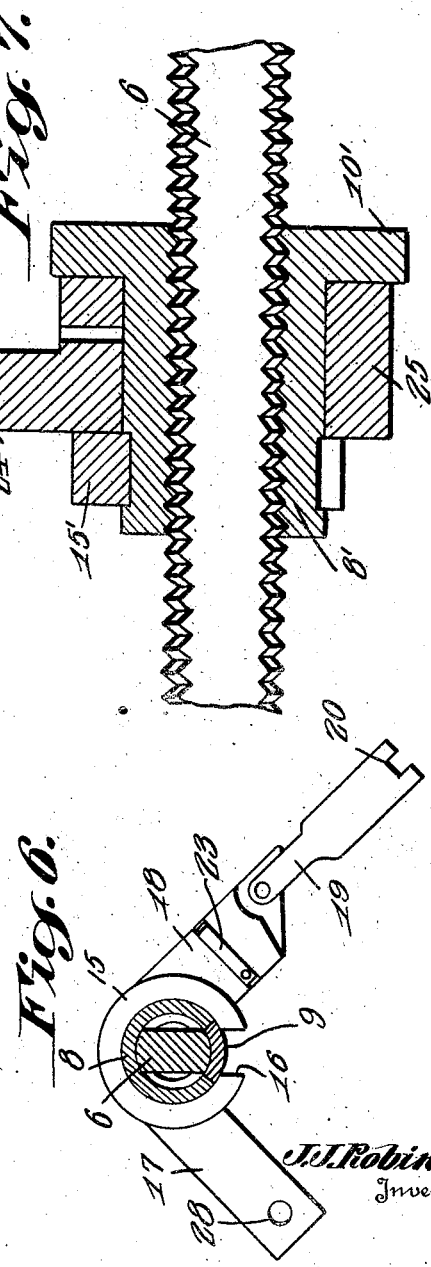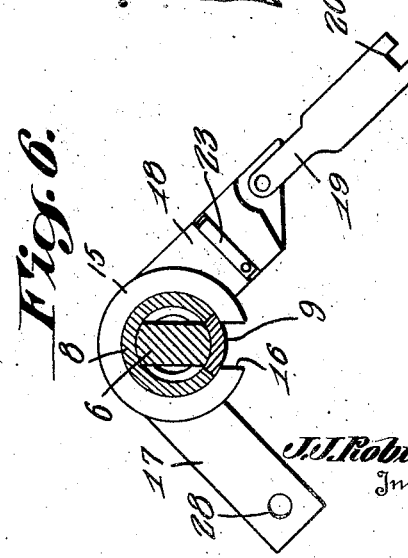

Patented Feb. 23, 1926.

1,574,445

UNITED STATES PATENT OFFICE.

JONATHAN J. ROBINSON, OF PHILADELPHIA, PENNSYLVANIA.

SAW GAUGE.

Application filed November 15, 1923. Serial No. 674,963.

*To all whom it may concern:*

Be it known that I, JONATHAN J. ROBINSON, a citizen of the United States, residing at Philadelphia, in the county of Philadelphia and State of Pennsylvania, have invented a new and useful Saw Gauge, of which the following is a specification.

This invention relates to saw gauges and is designed primarily as an improvement upon the structure disclosed in Patent No. 867,081 issued to me on September 24, 1907.

In the patented device it was impossible to effect a minute adjustment of the stop members of the gauge because the smallest adjustment was equal to the width of a thread on the holding bar of the gauge.

It is an object of the present invention to provide a stop capable of quick application and adjustment as heretofore but which is provided with means whereby after the stop has been placed in an approximate position, it can be further adjusted minutely so as to locate it accurately at the point of use.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings

Figure 1 is a plan view of the gauge, a portion thereof being broken away.

Fig. 2 is an elevation of the gauge, a portion being broken away.

Fig. 3 is an end view.

Fig. 4 is a section on line 4—4, Fig. 1 and showing one form of stop in full lines and broken lines in two different positions respectively.

Fig. 5 is an enlarged section on line 5—5, Fig. 1, through the threaded bar, the split sleeve thereon and the yoke, engaging the sleeve, said parts being partly inverted.

Fig. 6 is a section on line 6—6, Fig. 1.

Fig. 7 is an enlarged section on line 7—7, Fig. 1, the threaded bar being shown in elevation.

Referring to the figures by characters of reference 1 designates a portion of a table on which is mounted an elongated guide bar 2 provided in one side with a longitudinal recess 3 forming end shoulders 4. This bar is graduated throughout its length to indicate units of measure and fractions thereof and it is to be understood that the bar is fixed relative to the table. Secured on the bar at the end portions thereof are brackets 5 in which are fixedly mounted the end portions of a carrier bar 6. This bar is preferably formed of a heavy screw threaded rod or shaft opposed portions of which are flattered throughout the length of the bar or through a portion of the length thereof so that the threads are thus interrupted, as at 7.

Heretofore it has been practice to provide stop members with slotted or yoke-like portions adapted to be placed astride the flattened carrier bar at the point where the stop member is to be held and to then turn the stop member to active position so as to engage the threads and be prevented from moving longitudinally of the bar. This construction has been objectionable, however, because the minute adjustment necessary where high class work is to be done, could not be effected. To overcome the objection mentioned there has been provided, in the present instance, a sleeve 8 interiorly screw threaded so as to engage the threads on the carrier bar, this sleeve being formed with a removable segmental section 9 so proportioned that, when detached from the other portion of the sleeve, it will allow the sleeve to be lifted off of the flattened carrier bar as will be plainly apparent by referring to Fig. 5. One end of the sleeve is formed with a hand wheel or knob 10 so that the sleeve can be rotated readily. The other end portion of the sleeve has an annular groove 11 adapted to receive a holding yoke 12. The removable section 9 as well as the diametrically opposed portion of the sleeve 8 has the inner wall of its groove flattened as shown at 13 so that the yoke 12 can be slipped onto these flattened faces and thus hold the parts of the sleeve assembled and at the same time be held against rotation on the sleeve.

A set screw 14 is carried by the yoke and is adapted to be tightened against the section 9 to bind said section tightly against the opposed member of the sleeve 8 and also to fasten the yoke 12 in place.

Pivotally mounted on the sleeve 8 is the collar portion 15 of the stop member of the gauge, this collar portion being formed with a longitudinal slot 16 the width of which is slightly greater than the thickness of the flattened portion of the carrier bar 6. A lubricant receiving aperture 30 extends into collar portion 15. Extending from collar 15 is a stop finger 17 and a holding finger 18. To the holding finger is pivotally connected a link 19 the free end of which is preferably forked as at 20 so as to engage the outer side wall 21 of a groove 22 formed longitudinally in the guide bar 2. A clip 23 is preferably provided on the finger 18 for the purpose of holding a tag indicating clearly to the operator the point at which the stop has been set.

As shown at the right of Figs. 1 and 2 a slightly modified form of stop can be used in connection with the bar 6. This stop includes a sleeve 8' similar to sleeve 8 and provided with a knob or hand wheel 10'. A yoke 12', like the yoke 12, is mounted on sleeve 8'. This modified stop does not utilize the finger 18 and link 19 but, instead, has an upwardly projecting finger piece 24 whereby the stop collar 25 and finger 26 can be rotated on the sleeve 8' until the finger piece 24 comes against the bar 2 at a point where it will support the finger 26 in an upwardly extended position above the bar 6. Finger 26 can be provided with a stop screw 27 for engagement by the work and whereby an extremely minute adjustment can be obtained. Finger 17 can also be provided with a screw for this purpose and an opening 28 is provided in the finger to receive such a screw. An opening 31 may be provided in the collar 25 for receiving a lubricant.

In using this gauge any desired number of stops can be placed on the carrier bar to indicate different lengths to which the stock is to be cut. These stops can be of either of the forms desired. In the form shown in Figures 4, 5 and 6 and at the left of Figures 1 and 2, the stops are placed in position first by sliding the slotted sleeve member 8 onto the carrier bar 6. The collar 15 of the stop is then placed astride bar 6 and slipped onto sleeve 8 and its removable member 9 as shown by full lines in Fig. 4. The collar will come against the hand wheel 10 and thereafter the yoke 12 is slipped into engagement with the split sleeve and fastened thereby to hold the parts properly assembled. This placing of the parts on the bar is effected approximately at the point where the stop is to be held and after the parts have been assembled the hand wheel is rotated so as to feed the stop to the exact position where it is to be used. As the sleeve is threaded on the carrier bar a very minute adjustment can be effected. The same procedure is followed in placing in position the modified form of stop shown at the right of Figures 1 and 2 and in Figure 7. After the different stops 17 have been placed where desired they can be held in inactive positions with the ends of their fingers seated in the elongated recess 3 so that a board placed against the side of bar 2 will bridge the recess and those stops projecting into the recess. The stops are thus held inactive by the links 19 resting on the top of the bar 2. When it is desired to use one of the stop fingers 17 to limit the movement of the stock and thus act as a gauge, its link 19 is removed from groove 22 in bar 2 so that finger 17 will swing to a position outside of recess 3 as shown by full lines in Fig. 4. The modified stop including finger 26 is shifted out of active position by overturning it with finger piece 24 resting on bar 2. When finger 26 is extended downwardly it engages the table 1 at a point outside of recess 3 as will be seen by referring to Fig. 3.

The stops can be readily detached and readjusted simply by reversing the operation hereinbefore pointed out.

It is to be understood that the hand wheels 10 and 10' are integral with the two sections of the respective sleeves. In other words the hand wheel is segmental, one segment being formed with the section 9, as clearly shown in Fig. 3 while the remaining portion is integral with the balance of the sleeve 8. Hand wheel 10' is similarly arranged as will be seen by referring to Figure 3.

What is claimed is:—

1. A gauge comprising a screw threaded carrier bar having an interrupted thread, a split sleeve removable radially from the carrier bar, a stop member rotatably mounted on the sleeve and removable radially from the bar, and means for holding the members of the sleeve and the stop member assembled.

2. A gauge comprising a screw threaded carrier bar having an interrupted thread, a split sleeve removable radially from the bar, a stop member rotatably mounted on the sleeve and removable radially from the bar when detached from the sleeve, and means upon the sleeve for holding the parts of the sleeve assembled with each other and with the stop member.

3. A gauge comprising a screw threaded carrier bar having its thread interrupted, a stop member removable radially from the bar, and means interposed between and cooperating with the stop member and bar for minutely adjusting the stop member longitudinally of the bar, said means including a sectional sleeve removable radially from the bar, and means for holding the parts of the sleeve assembled with each other and with the stop member.

4. A gauge comprising a screw threaded carrier bar having its threads interrupted, a stop member removable radially from the bar, and means interposed between and cooperating with the stop member and bar for minutely adjusting the stop member longitudinally of the bar, said means including a sectional sleeve removable radially from the bar, and means for holding the parts of the sleeve assembled with each other and with the stop member, said means including a split sleeve removable radially from the bar but held normally assembled with the bar by the stop member, a sectional hand wheel integral with the members of the sleeve, and means engaging the sleeve for holding said sleeve assembled with the stop member.

5. A gauge comprising a screw threaded carrier bar having its threads interrupted, a stop member removable radially from the bar, and means interposed between and cooperating with the stop member and bar for minutely adjusting the stop member longitudinally of the bar, said means including a sectional sleeve removable radially from the bar, and means for holding the parts of the sleeve assembled with each other and with the stop member, said means including a sectional sleeve, a sectional hand wheel integral with the sleeve sections, and a yoke straddling and detachably engaging the sleeve sections to hold them assembled with the stop member.

6. A gauge comprising a screw threaded carrier bar, a sleeve removably mounted upon the bar and adjustable thereon, a stop member rotatably mounted on the sleeve and removable radially, and means for holding the sleeve and the stop member assembled.

7. A gauge comprising a screw threaded carrier bar, a split sleeve removable radially from the carrier bar, a stop member rotatably mounted on the sleeve and removable radially from the bar, and means for holding the members of the sleeve and the stop member assembled.

8. A gauge comprising a screw threaded carrier bar having interrupted threads, a split sleeve insertable onto that portion of the bar having interrupted threads and adjustable longitudinally of the bar, and a stop pivotally mounted on the sleeve and movable radially from the bar.

In testimony that I claim the foregoing as my own, I have hereto affixed my signature.

JONATHAN J. ROBINSON.